United States Patent
Chen et al.

(10) Patent No.: US 9,009,460 B2
(45) Date of Patent: Apr. 14, 2015

(54) NODE COMPUTING DATA ENCRYPTION METHOD

(71) Applicants: Inventec (Pudong) Technology Corporation, Shanghai (CN); Inventec Corporation, Taipei (TW)

(72) Inventors: Yu-Jia Chen, Taipei (TW); Chen-Hung Liao, Taipei (TW); Li-Chun Wang, Taipei (TW); Chung-Chih Li, Taipei (TW); Ying-Chieh Liao, Taipei (TW)

(73) Assignees: Inventec (Pudong) Technology Corporation, Shanghai (CN); Inventec Corporation, Taipei (TW)

( * ) Notice: Subject to any disclaimer, the term of this patent is extended or adjusted under 35 U.S.C. 154(b) by 55 days.

(21) Appl. No.: 13/802,206

(22) Filed: Mar. 13, 2013

(65) Prior Publication Data
US 2014/0122896 A1    May 1, 2014

(30) Foreign Application Priority Data
Oct. 31, 2012    (CN) .......................... 2012 1 0429367

(51) Int. Cl.
*H04L 29/06*    (2006.01)
*G06F 21/60*    (2013.01)

(52) U.S. Cl.
CPC ................................... *G06F 21/602* (2013.01)

(58) Field of Classification Search
None
See application file for complete search history.

(56) References Cited

U.S. PATENT DOCUMENTS

2004/0174995 A1*    9/2004    Singh .............................. 380/30
2010/0014669 A1*    1/2010    Jiang ............................. 380/255

\* cited by examiner

*Primary Examiner* — Saleh Najjar
*Assistant Examiner* — William G O'Hara
(74) *Attorney, Agent, or Firm* — Huffman Law Group, PC

(57) ABSTRACT

A data encryption method, adapted to a node computing device in a cloud server system comprises following steps. A primary data is received. A dimension of an encrypted matrix is computed. An encryption length is computed, and data segments matching the encryption length are extracted from the primary data sequentially according to the encryption length. A plurality of encrypted segments is obtained by encrypting the extracted data segments respectively through the encrypted matrix.

7 Claims, 3 Drawing Sheets

NODE COMPUTING DATA ENCRYPTION METHOD

CROSS-REFERENCE TO RELATED APPLICATIONS

This non-provisional application claims priority under 35 U.S.C. §119(a) on Patent Application No(s). 201210429367.6 filed in China on Oct. 31, 2012, the entire contents of which are hereby incorporated by reference.

BACKGROUND OF THE INVENTION

1. Technical Field of the Invention

The disclosure relates to a security mechanism, and more particularly to a data encryption method.

2. Description of the Related Art

In the recent years, with the rapid development of the internet and the technological advancements of software and hardware, users are demanding higher standards of information services. As a result, cloud computing technology is expanding rapidly and it has been proved in many setups of commercial platforms. Cloud computing technology requires a large scale computing capability, and provides various software applications through large cloud computing data centers. Therefore, corporations can take advantage of the powerful processing capabilities provided by cloud computing services providers without investing a large amount of money on handling information.

Cloud computing technology includes the concept of infrastructure as a service (IaaS), of platform as a service (PaaS) and of software as a service (SaaS). Furthermore, the assurance of safety, integrity and privacy of customer information has become one of the most issues for users using the cloud computing services in the recent years.

In general, before data is uploaded to a cloud drive for storage, the data is encrypted in order to prevent the data from being stolen. However, the encryption of data usually causes the data to be inflated, so that more space is required for storing the data.

SUMMARY OF THE INVENTION

A data encryption method provided by the disclosure is adapted to a node computing device in a cloud server system, and comprises following steps. A primary data is received. A dimension of an encrypted matrix is computed. An encryption length is computed, and a plurality of data segments is extracted from the primary data sequentially according to the encryption length. A plurality of encrypted segments is obtained by encrypting the extracted data segments respectively through the encrypted matrix.

In an embodiment of the disclosure, after the encryption length is computed, the encryption length is used as a length of each of the data segments to recombine the primary data and obtain a recombined data. The recombined data is then encrypted through the encrypted matrix to obtain an encrypted array.

In an embodiment of the disclosure, after the encrypted array is obtained, the encrypted array is recombined to obtain the encrypted segments.

In an embodiment of the disclosure, in the step of computing the dimension of the encrypted matrix, a power of a finite field is determined according to a basis of the primary data, and the dimension of the encrypted matrix is determined according to the power of the finite field.

In an embodiment of the disclosure, the basis of the primary data and the power of the finite field satisfy a first limitation condition of $2^k \geq d$. k represents the power of the finite field, and d represents the basis of the primary data. Furthermore, the dimension of the encrypted matrix satisfies a second limitation condition, namely $n<2^k$ and $n \leq r$. The dimension of the encrypted matrix is n×n, k represents the power of the finite field, and r represents a quantity of the data segments formed by segmenting the primary data.

In an embodiment of the disclosure, the step of computing the encryption length is performed according to the power of the finite field.

In an embodiment of the disclosure, the encryption length and the power of the finite field satisfy a third limitation condition of $S=k/\log_2 d$, where S represents the encryption length, k represents the power of the finite field, and d represents the basis of the primary data. Alternatively, the third limitation condition is $S \geq (1/\alpha) \times \log_d(2^k-1)$, where S represents the encryption length, k represents the power of finite field, d represents the basis of the primary data, and α represents an inflation tolerance value.

BRIEF DESCRIPTION OF THE DRAWINGS

The disclosure will become more fully understood from the detailed description given herein below for illustration only, thus does not limit the disclosure, wherein.

DETAILED DESCRIPTION

Figure 1:
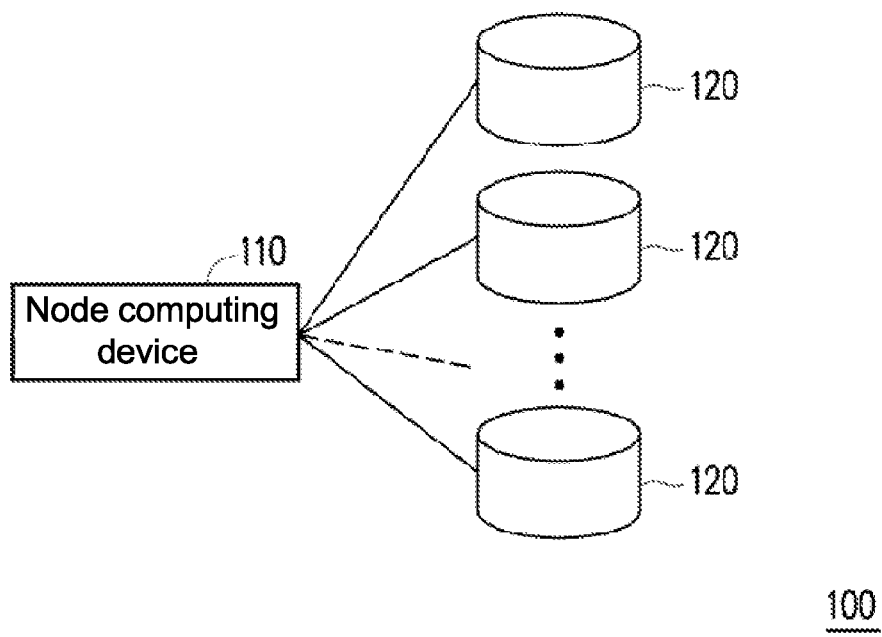
FIG. 1 is a schematic diagram of a cloud server system according to an embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other examples, well-known structures and devices are schematically shown in order to simplify the drawing.

In each embodiment below, a cloud server system is embodied by one or a plurality of nodes. Each of the nodes is disposed with one or a plurality of node devices. Each of the node devices is a physical device such as a computer host or a server. The node devices are categorized into node computing devices and node storage devices. The node computing device is used for providing computing services. The node storage device is used for providing storage services. For example, the node storage device includes one or a plurality of data storage centers. The physical devices have different components according to the different applications. The physical device, used as a node computing device, includes one or a plurality of processors with a virtual technology capability and a high computing capability, a high capacity memory, and a communication unit, and can further include a storage unit with a high accessing speed selectively. The physical device, used as a node storage device, mainly includes a storage unit with a high accessing speed and a high capacity, and can further include a processor, a memory and a communication unit.

FIG. 1 is a schematic diagram of a cloud server system according to an embodiment of the disclosure. Please refer to FIG. 1, a cloud server system 100 includes a node computing device 110 and a plurality of data storage centers 120. After receiving a primary data, the node computing device 110 encrypts the primary data to obtain a plurality of ciphertext segments, and the ciphertext segments are stored in the data storage centers 120 through a network. Herein, a quantity of the data storage centers 120 can be two or more than two, and is designed according to the application requirements of the cloud server system 100.

Figure 2:
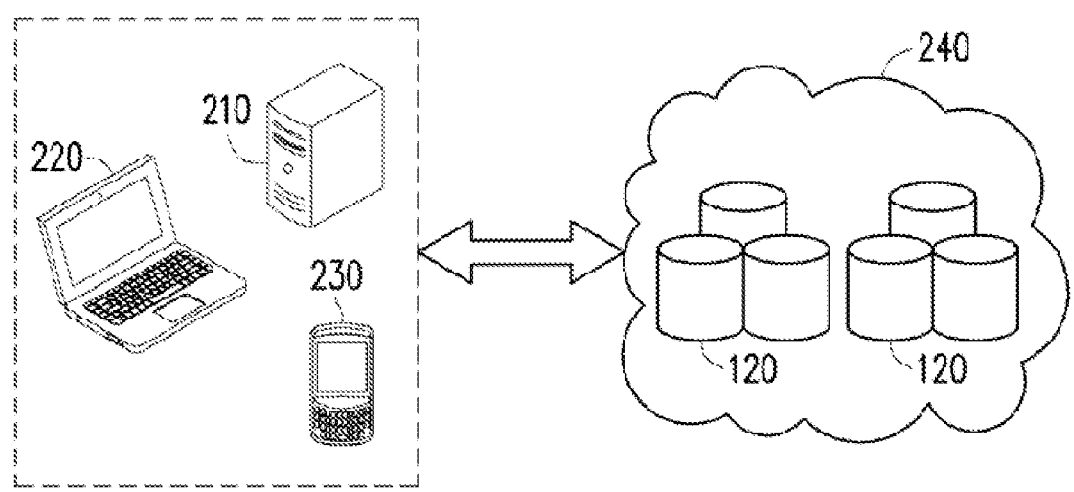
FIG. 2 is an infrastructural diagram of a cloud storage according to an embodiment of the disclosure.

On the other hand, the data storage centers 120 can be regarded as a cloud storage system allowing users to upload data. FIG. 2 is an infrastructural diagram of a cloud storage system according to an embodiment of the disclosure. A cloud storage system 240 is an important part in the cloud server system 100. The cloud storage system 240 is embodied by, for example, a plurality of node storage devices. Each of the node storage devices at least includes a data storage center 120. In other words, the cloud storage system 240 provides a very high storage capacity through the node storage devices. Different users can use various types of electronic devices, for example, a server 210, a notebook computer 220 or a mobile phone 230, which is capable of linking a network, to upload various types of information to the cloud storage system 240 through the network.

Figure 3:
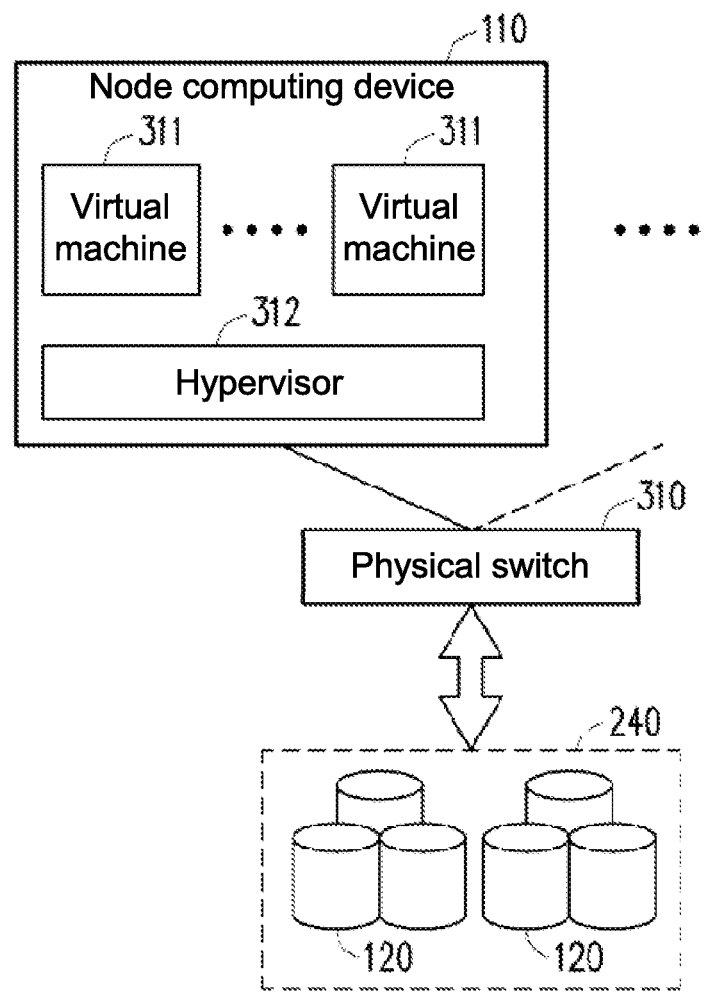
FIG. 3 is a schematic diagram of a cloud server system according to another embodiment of the disclosure.

FIG. 3 is an schematic diagram of a cloud server system according to another embodiment of the disclosure. To clearly describe the disclosure, only one node computing devices 110 in this embodiment is taken as an example. However, in other embodiments, the cloud server system 100 can also include two or more than two node computing devices 110.

The node computing device 110 includes a plurality of virtual machines (VM) 311 and a hypervisor 312. The node computing device 110 is connected to the cloud storage system 240 through a physical switch 310. Herein, the cloud storage system 240 is embodied by one or a plurality of physical node storage devices, and includes a plurality of data storage centers 120.

Take the smart network regulator (SNR) as an example, in consideration of the overall hardware resources, the virtual machines 311 are installed in different physical machines (the node computing devices 110). The virtual machines 311 in one physical machine are connected to each other and managed through the hypervisor 312. All of the physical machines in the cloud server system 100 are connected to each other through the physical switch 310. In other words, the virtual machine 311 rented by a user is in the node computing devices 110 in the cloud server system 100. The rented virtual machine 311 is connected to the other node devices in the cloud server system 100 through the network.

Figure 4:
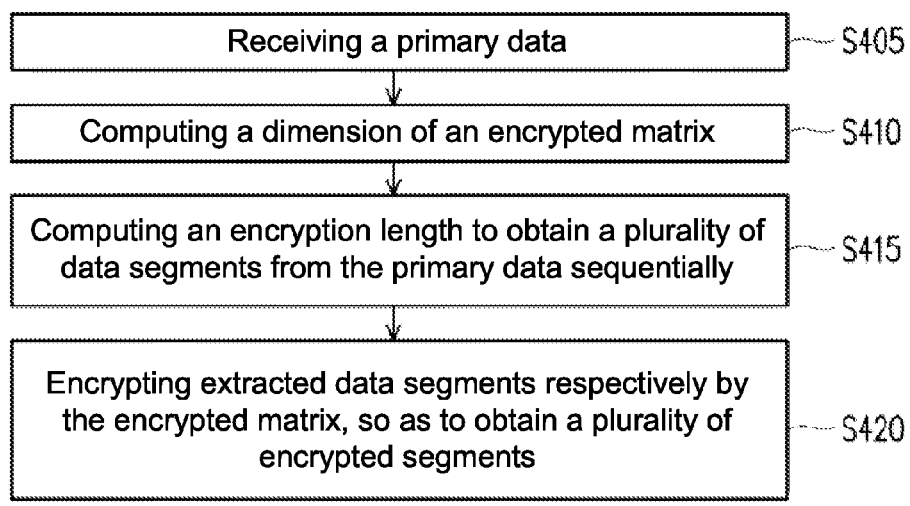
FIG. 4 is a flow chart of a data encryption method according to an embodiment of the disclosure.

FIG. 4 is a flow chart of a data encryption method according to an embodiment of the disclosure. Please refer to FIGS. 1 and 4. In step S405, a primary data is received through the node computing device 110. The primary data can be, for example, a picture, a file, a sound file, a video file, an electronic email and a document. For example, an electronic device can connect to the node computing device 110 in the cloud server system 100 through a network, so as to process the primary data via the virtual machines 311 in the node computing devices 110.

In step S410, a dimension of an encrypted matrix is computed by the node computing device 110. For example, an encrypted matrix A is an n×n matrix, and all coefficients $a_i$ of the encrypted matrix A are different and are equal to zero. Herein, a dimension n of the encrypted matrix A is computed according to a basis of the primary data. This may prevent the encrypted data from excessively inflating.

In step S415, an encryption length is computed through the node computing device 110, and whereby a plurality of data segments is extracted from the primary data sequentially. Herein, in order to solve the problem of data inflation caused by the encryption of the primary data, the encryption length is recomputed, and the primary data is segmented into a plurality of the data segments according to the encryption length as the segmented length. Thus, the encrypted data segments may not inflate excessively.

In step S420, a plurality of encrypted segments is obtained by encrypting the extracted data segments respectively via the node computing device 110 according to the encrypted matrix. In other words, the node computing device 110 computes an appropriate length (i.e. the encryption length) in order to segment the primary data into the data segments. Then, each of the data segments is encrypted through the encrypted matrix in order to obtain a plurality of ciphertext segments.

Subsequently, the node computing device 110 respectively stores each of the ciphertext segments in the data storage centers 120 in the cloud server system 100 through the network, or stores the ciphertext segments in the same data storage center 120. Herein, the data storage centers 120, for example, belong to different node storage devices. In other words, the node computing device 110 stores the different ciphertext segments in the different data storage centers 120 through the network. In this embodiment, if p ciphertext segments are obtained from the primary data, the p ciphertext segments are stored in p data storage centers 120 respectively.

In some embodiments, more than one the cipher text segment can be stored in the same data storage center 120. For example, a cipher text segment 1 and a cipher text segment 2 are stored in a data storage center A, and a cipher text segment 3 and a cipher text segment 4 are stored in a data storage center B. The rest can be deduced by analogy. In some embodiments, all the ciphertext segments can not be stored in the same data storage center 120.

A data encryption algorithm is described in detail hereinafter. Below steps are performed after the node computing device 110 receives a primary data b having a basis d.

Firstly, a power k of the finite field is determined according to the basis d of the primary data b. Herein, the basis d and the power k of finite field satisfy a first limitation condition of $2^k \geq d$.

Furthermore, the dimension n of the encrypted matrix A is determined according to the power k of the finite field. In addition, an encryption length S is computed according to the power k of the finite field, and a recombined array b' is obtained by recombining the primary data b according to the encryption length S.

Assume that the node computing device 110 receives the primary data b having the basis d, and the primary data b is indicated as an array of $b=(b_1, \ldots, b_m)$, where m is a positive integer. Each element in the primary data b is indicated as $b_i$, and i is a positive integer from 1 to m. After an encryption length $S_i$ is computed, the primary data b is recombined according to the encryption length $S_i$ in order to obtain the recombined array b' as follows.

$$b' = (b_1 \ldots b_{S_1}, b_{S_1+1} \ldots b_{S_1+S_2}, \ldots, b_{\sum_{i=1}^{r-1} S_i+1} b_{\sum_{i=1}^{r} S_i})$$

r represents a quantity of the data segments formed by segmenting the primary data b, i.e. a quantity of elements in the recombined array b'.

Then, the encrypted matrix A is formed, and the recombined array b' is encrypted through the encrypted matrix A in order to obtain an encrypted array c. A plurality of ciphertext segments $\tilde{c}_i$ are stored in one or more than one the data storage center 120. Herein, the dimension (i.e. n×n) of the encrypted matrix A satisfies a second limitation condition including $n<2^k$ and $n\leq r$.

Furthermore, the encryption length S is determined according to the third limitation condition. In other words, the encryption length S and the power k of the finite field satisfy the third limitation condition. Herein, the third limitation condition is, for example, strictly non-overflowing or α loosely inflation. The strictly non-overflowing (hereinafter regarded as a theorem 1) means that a digit $l_d(c_i)$ of the encrypted ciphertext segments equals to a digit $l_d(b_i)$ of the data segments before encryption. α in the α loosely inflation (hereinafter regarded as a theorem 2) represents an inflation tolerance value. a represents an inflation degree between the digit $l_d(c_i)$ and the digit $l_d(b_i)$, i.e. $l_d(c_i)/l_d(b_i)$ is smaller than or equal to α.

A Vandermonde matrix is used as the encrypted matrix A below for description, and the dimension of the encrypted matrix A is n×n. A Galois Field is used as the finite field below for description.

$$A = \begin{pmatrix} a_1^0 & a_2^0 & \cdots & a_n^0 \\ a_1^1 & a_2^1 & & a_n^1 \\ \vdots & & \ddots & \\ a_1^{n-1} & a_2^{n-1} & \cdots & a_n^{n-1} \end{pmatrix};$$

all coefficients $a_1$ in the encrypted matrix A are different and are equal to zero, and according to the finite field $F_q(q=2^k>n)$, the coefficients $a_i$ are within an interval $[0, 2^k-1]$.

[Theorem 1]

If $S_i=S=k/\log_2 d$, it satisfies the strictly non-overflowing. The proof procedure is described as follows.

Firstly, assume $S_i<k/\log_2 d$, and then an equation (1) is obtained:

$$k/\log_2 d = k \cdot \log_d 2 = \log_d 2^k. \qquad \text{Equation (1)}$$

The encryption procedure exceeds an integer, and it is known that $S_i \leq \log_d(2^k-1)$. Because $c_i$ is distributed within the set of $\{0, \ldots, 2^k-1\}$, the maximum encryption length for the encrypted elements is indicated as $l_d(c_i)_{max}=\log_d(2^k-1)$. Furthermore, the encryption length of $b_i$ is indicated as $l_d(b_i)$. Therefore, an equation (2) can be obtained as follows.

$$S_i=l_d(b_i)\leq \log_d(2^k-1)=l_d(c_i)_{max} \qquad \text{Equation (2)}$$

Because the data length after encryption may be greater than the data length before encryption, assume $S_i>k/\log_2 d$. Both $S_i$ and $k/\log_2 d$ are exponentiated with the basis d, then $d^{S_i}>d^{\log_d 2^k}=2^k$ can be obtained. However, the condition that $d^{S_i}$ is the value of $a_i$, and the condition that the maximum value of $a_i$ is $2^k-1$, contradict each other.

Therefore, if $S_i<\log_d(2^k-1)$, then $S_i<k/\log_2 d$, the data after encryption will be inflated excessively. If $d^{S_i}-1>2^k-1$, then $S_i>k/\log_2 d$, this does not satisfy the limitation condition of the finite field.

Accordingly, it is obtained that the encryption length S is $k/\log_2 d$.

[Theorem 2]

If $S_i \geq (1/\alpha)\times \log_d(2^k-1)$, it satisfies the α loosely inflation. By using $S_i=l_d(b_i)$ and $l_d(c_i)_{max}=\log_d(2^k-1)$, the proof is indicated as follows.

$$\sum_{j=1}^{|\tilde{c}_i|} l_d(c_j) \leq |\tilde{c}_i| \cdot \log_d(2^k-1) \leq \qquad \text{Equation 3}$$

$$\alpha \cdot \frac{1}{\alpha} \cdot |\tilde{c}_i| \cdot \log_d(2^k-1) \leq \alpha \cdot |\tilde{c}_i| \cdot S_i = \alpha \cdot |\tilde{c}_i| \cdot l_d(b_i)$$

Accordingly, the encryption length S is recomputed by using the theorem 1 or the theorem 2, and whereby the primary data b can be recombined.

For example, assume the basis d of the primary data b is 2, and the primary data b=(0,0,1,0,1,1,0,1). According to d=2, it is determined that the power k of the finite field is 3 under the first limitation condition of $2^k \geq d$.

Furthermore, the encryption length $S_i$ is determined according to the theorem 1 or the theorem 2. Herein, the theorem 1 is taken as an example, and $S_i=S=k/\log_2 d$ is obtained. Herein, it is computed that S=3. Then, the primary data b is recombined according to the encryption length S=3 in order to obtain the recombined array b'=(001, 011, 101).

Under the second limitation condition including $n<2^k$ and $n \leq r$, it is determined that the dimension of the encrypted matrix A is 3×3. For example, the encrypted matrix A is represented as follows.

$$A = \begin{pmatrix} 1 & 1 & 1 \\ 4 & 7 & 1 \\ 6 & 3 & 1 \end{pmatrix}.$$

Then, the recombined array b' is encrypted by using the encrypted matrix A, so that the encrypted array c=(111, 011, 110) is obtained. In addition, the encrypted array c can be further recombined in order to obtain $\tilde{c}$=(1110, 11110). The ciphertext segment of 1110 and the ciphertext segment of 11110 are stored in the different data storage centers 120 respectively.

In this embodiment, when encrypting the primary data and stores the encrypted primary data in the different data storage centers 120 respectively, the node computing device 110 writes every index corresponding to one data storage center 120 where one ciphertext segment is stored, into an index file. Therefore, when an authenticated user wants to read the data, the ciphertext segments stored in the different data storage centers 120 can be acquired by the node computing device 110 through the index file, so as to be decoded and restored to the primary data. If the user wants to use the primary data, all the encrypted segments of the primary data can be extracted from the data storage centers, and the encrypted segments are decoded, then the primary data can be obtained from the decoded segments.

As a conclusion from the above embodiments, the dimension of the encrypted matrix is computed in order to control the degree of data inflation after encryption, and the length (i.e. the encryption length) of the data segments formed by segmenting the primary data is computed. Thus, the inflation of the encrypted segments formed by encrypting the data segments via the encrypted matrix, may be maintained in a tolerance range, so as to avoid the data inflation caused by the encryption of data. Furthermore, the primary data can be stored in the data storage centers separately. When hackers can not obtain the ciphertexts distributed among the data storage centers, the primary data can not be read. Therefore, no content of the primary data will be leaked out.

What is claimed is:

1. A data encryption method, adapted to a node computing device in a cloud server system, and comprising:
   receiving a primary data;
   determining a power of a finite field according to a basis of the primary data;
   determining a dimension of an encrypted matrix according to the power of the finite field;
   computing an encryption length, and sequentially obtaining a plurality of data segments matching the encryption length, from the primary data according to the encryption length; and
   obtaining a plurality of encrypted segments by encrypting each of the plurality of extracted data segments respectively through the encrypted matrix
   wherein the basis of the primary data and the power of the finite field satisfy a first limitation condition, and the first limitation condition comprises: $2^k \geq d$, wherein k represents the power of the finite field, and d represents the basis of the primary data.

2. The data encryption method according to claim 1, wherein after the step of computing the encryption length, the data encryption method further comprises:
   recombining the primary data by using the encryption length as a length of each of the plurality of data segments, to obtain a recombined data; and
   encrypting the recombined data by using the encrypted matrix, to obtain an encrypted array.

3. The data encryption method according to claim 2, wherein after the step of obtaining the encrypted array, the data encryption method further comprises:
   recombining the encrypted array to obtain the encrypted segments.

4. The data encryption method according to claim 1, wherein the dimension of the encrypted matrix satisfies a second limitation condition, and the second limitation condition comprises:

$n < 2^k$, and $n \leq r$;

wherein the dimension of the encrypted matrix is n×n, k represents the power of the finite field, and r represents a quantity of the data segments formed by segmenting the primary data.

5. The data encryption method according to claim 1, wherein the step of computing the encryption length comprises:
   computing the encryption length according to the power of the finite field.

6. The data encryption method according to claim 5, wherein the encryption length and the power of the finite field satisfy a third limitation condition, and the third limitation condition comprises:

$S = k/\log_2 d$;

wherein S represents the encryption length, k represents the power of the finite field, and d represents the basis of the primary data.

7. The data encryption method according to claim 5, wherein the encryption length and the power of the finite field satisfy a third limitation condition, and the third limitation condition comprises:

$S \geq (1/\alpha) \times \log_d(2^k - 1)$;

wherein S represents the encryption length, k represents the power of the finite field, d represents the basis of the primary data, and α represents an inflation tolerance value.

* * * * *